United States Patent
Zhao

(10) Patent No.: US 8,326,306 B2
(45) Date of Patent: Dec. 4, 2012

(54) METHOD AND APPARATUS FOR CONGESTION CONTROL IN LOCATION UPDATING

(75) Inventor: Hongxia Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 13/108,697

(22) Filed: May 16, 2011

(65) Prior Publication Data
US 2011/0217982 A1 Sep. 8, 2011

Related U.S. Application Data

(63) Continuation of application No. PCT/CN2009/074930, filed on Nov. 13, 2009.

(30) Foreign Application Priority Data

Nov. 17, 2008 (CN) .......................... 2008 1 0177330

(51) Int. Cl.
*H04W 36/00* (2009.01)
*H04W 4/00* (2009.01)
(52) U.S. Cl. ........................ 455/438; 370/338
(58) Field of Classification Search .................. 455/438, 455/456.1–456.6, 406, 433, 437, 424; 370/338, 370/328, 252
See application file for complete search history.

(56) References Cited

U.S. PATENT DOCUMENTS

| | | | |
|---|---|---|---|
| 6,091,952 A | 7/2000 | Xu et al. | |
| 2006/0094446 A1* | 5/2006 | Duan | 455/456.3 |
| 2008/0076434 A1* | 3/2008 | Shigaki et al. | 455/442 |
| 2010/0113017 A1* | 5/2010 | Bleckert et al. | 455/433 |

FOREIGN PATENT DOCUMENTS

| | | |
|---|---|---|
| CN | 1206542 A | 1/1999 |
| CN | 101060711 A | 10/2007 |
| CN | 101150859 A | 3/2008 |
| WO | WO 2007111009 A1 | 10/2007 |
| WO | WO 2007126352 A1 | 11/2007 |
| WO | WO 2008049376 A1 | 5/2008 |
| WO | WO 2008/123580 A1 | 10/2008 |

OTHER PUBLICATIONS

Zhang et al., "Location Management Congestion Problem in Wireless Networks", IEEE Transactions on Vehicular Technology, vol. 56, No. 2, Mar. 2007.

(Continued)

*Primary Examiner* — Michael Faragalla
(74) *Attorney, Agent, or Firm* — Brinks Hofer Gilson & Lione

(57) ABSTRACT

A method, an apparatus and a system for congestion control in location updating are provided. The method includes: setting location updating congestion control information according to network circumstances (s101); and sending the location updating congestion control information to a terminal so as to implement, by the terminal, the congestion control in location updating according to the location updating congestion control information (s102). By the method, it can be effectively controlled whether the terminal initiates the location updating immediately or initiates the location updating with delay in intercell handover, so as to effectively smooth the system bandwidth required in the location updating, reduce the system call loss, and increase the terminal location updating efficiency and wireless resource utilization ratio.

19 Claims, 3 Drawing Sheets

OTHER PUBLICATIONS

Written Opinion of the International Searching Authority issued in corresponding PCT Patent Application No. PCT/CN2009/074930, mailed Feb. 25, 2010.

International Search Report issued in corresponding PCT Patent Application No. PCT/CN2009/074930, mailed Feb. 25, 2010.

Office Action issued in corresponding Chinese Patent Application No. 200810177330.2, mailed Nov. 3, 2011.

Office Action issued in corresponding Chinese Patent Application No. 200810177330.2, mailed Jun. 13, 2012.

* cited by examiner

METHOD AND APPARATUS FOR CONGESTION CONTROL IN LOCATION UPDATING

CROSS-REFERENCE TO RELATED APPLICATIONS

This application is a continuation of International Application No. PCT/CN2009/074930, filed on Nov. 13, 2009, which claims priority to Chinese Patent Application No. 200810177330.2, filed on Dec. Nov. 17, 2008, both of which are hereby incorporated by reference in their entireties.

FIELD OF THE INVENTION

The present disclosure relates to the field of communication technology, and in particular, to method and apparatus for congestion control in location updating.

BACKGROUND OF THE INVENTION

Compared with the fixed network, the mobile communication has the advantage of mobility. When a user moves in the cellular mobile network, the continuity of the user service must be guaranteed. In the case that wide geographic areas are covered by different cells, when the user moves across the cells, not only the continuity of the ongoing service must be guaranteed, but also the location of the user terminal needs to be tracked, so that the user can be called in time. With the increasing areas covered by the cells that have dense concentrations of users, the hardness of the location management increases. Especially, if location updating in intercell handover for a number of users occurs in a short time, the location updating traffic may be too heavy, thereby resulting in congestion. After congestion, in one aspect, a lot of location updating traffic occupies air interface resources, so that the call fails due to a lack of the air interface resources; in another aspect, because the congestion easily causes the location update failure, the call may fail during congestion. If the user moves across cells frequently, the signaling overhead increases continuously. In this case, the method for taking advantage of wireless resources effectively and tracking locations of user terminals effectively becomes one of important mobility management technologies.

In the prior art, during terminal location updating, numerous terminals send location updating requests to the network side. Because location updating requests are based on the competitive mode, the location updating request that succeeds in competition can be accepted. However, the location updating request that fails to compete is rejected, leading to location update failure.

The inventor finds that at least the following problems exist in the prior art.

When a number of users move at the same time, a lot of location updating requests are generated. The location updating congestion cannot be controlled effectively. Moreover, access channels are preempted excessively during location updating congestion, leading to increasing call loss.

SUMMARY OF THE INVENTION

The embodiments of the present invention is directed to system and method for congestion control in location updating, in which a method for dynamically adjusting a location updating policy in intercell handover is provided, by this method, it can be effectively controlled whether the terminal initiates the location updating immediately or initiates the location updating with delay in intercell handover, so as to effectively smooth the system bandwidth required in the location updating, reduce the system call loss, and increase the terminal location updating efficiency and wireless resource utilization ratio.

An embodiment of the present invention provides a method for congestion control in location updating, where the method includes:

setting location updating congestion control information according to network circumstances; and sending the location updating congestion control information to a terminal so as to implement, by the terminal, the congestion control in location updating according to the location updating congestion control information.

An embodiment of the present invention provides a terminal, for congestion control in location updating, where the terminal includes:

a receiving module, adapted to receive location updating congestion control information sent by a network side device, where the location updating congestion control information is set according to network circumstances;

a calculating module, adapted to obtain a second delay time value by using a preset algorithm according to the location updating congestion control information received by the receiving module;

a detecting module, adapted to detect whether a location registration area of the terminal changes; and a time counting and requesting module, adapted to count time and send a location updating request to the network side device after the counted time reaches the second delay time value calculated by the calculating module if a detection result is that the location registration area changes.

An embodiment of the present invention provides a network side device, for congestion control in location updating, where the network side device includes:

a setting module, adapted to set location updating congestion control information according to network circumstances; and a sending module, adapted to send the location updating congestion control information set by the setting module to a terminal.

An embodiment of the present invention provides a system, for congestion control in location updating, where the system includes a network side device, communicatively connected to a terminal, in which:

the network side device is adapted to set location updating congestion control information according to network circumstances and send the location updating congestion control information to the terminal; and the terminal is adapted to receive the location updating congestion control information and implement the congestion control in location updating according to the location updating congestion control information.

BRIEF DESCRIPTION OF THE DRAWINGS

To illustrate the technical solutions according to the embodiments of the present invention more clearly, the accompanying figures for describing the embodiments are introduced briefly in the following. Apparently, the accompanying drawings in the following description are only some embodiments of the present invention; persons of ordinary skill in the art can derive other drawings according to the accompanying drawings without paying any creative efforts.

DETAILED DESCRIPTION OF THE EMBODIMENTS

The technical solutions according to the embodiments of the present invention will be clearly and fully described below with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
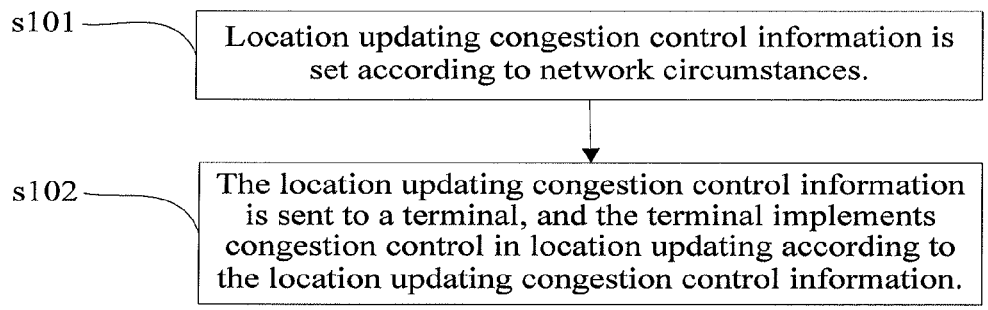
FIG. 1 is a flow chart of a method for congestion control in location updating according to Embodiment 1 of the present invention.

As shown in FIG. 1, Embodiment 1 of the present invention provides a method for congestion control in location updating, which includes the following steps.

In s101, location updating congestion control information is set according to network circumstances.

In s102, the location updating congestion control information is sent to a terminal, and the terminal implements the congestion control in location updating according to the location updating congestion control information.

The technical solutions according to the embodiments of the present invention provide a method for dynamically adjusting a location updating policy in intercell handover. By this method, location updating congestion control information is set, and it can be effectively controlled whether the terminal initiates the location updating immediately or initiates the location updating with delay in intercell handover according to the location updating congestion control information, so as to effectively smooth the system bandwidth required in the location updating, reduce the system call loss, and increase the terminal location updating efficiency and wireless resource utilization ratio.

Figure 2:
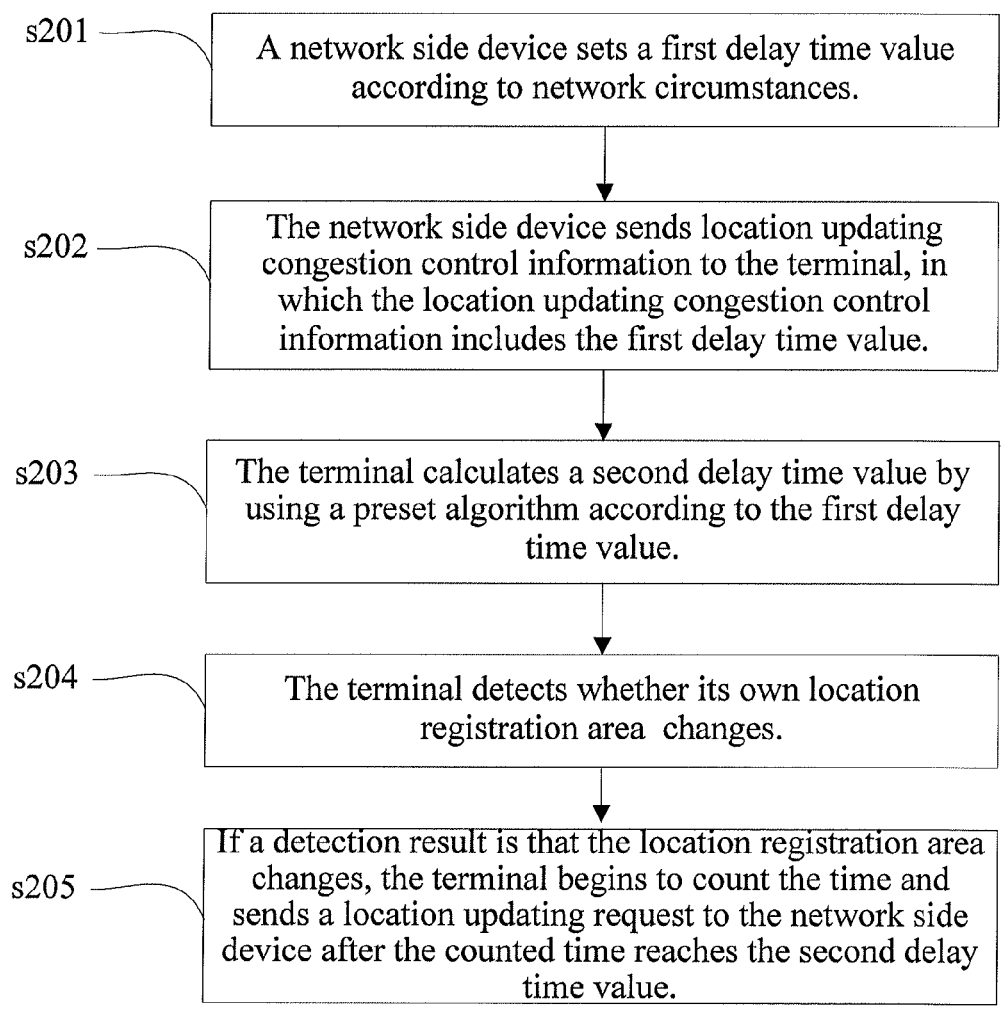
FIG. 2 is a flow chart of a method for congestion control in location updating according to Embodiment 2 of the present invention.

As shown in FIG. 2, Embodiment 2 of the present invention provides a method for congestion control in location updating, which includes the following steps.

In s201, a network side device sets a first delay time value according to network circumstances.

The methods of setting the first delay time value are as follows. For clear explanation, let $T_{Lu\_delay\_max}$ denote the first delay time, let $T_{Lu\_delay\_ue}$ denote the second delay time, and let $T_p$ denote a periodical location updating time.

Method 1:

The network circumstances of the network side device are assessed to generate an empirical value of the first delay time value, and the first delay time value is set according to the empirical value. The empirical value is adapted to give the default value of $T_{Lu\_delay\_max}$. The empirical value is obtained by experimenting and testing for a long time, gathering statistics of the experiment and test and calculating the results.

Method 2:

The first delay time value is generated according to the number of the terminals requiring the location updating and a location request access bandwidth parameter of the network side device.

Let $N_0$ denote the number of the terminals that already reside in the cell, let $N_{Lu}$ denote the number of the terminals that should complete location updating in intercell handover in instantaneous peak time, and let C denote the bandwidth of the Random Access Channel (RACH) of the cell, which is the number of the acceptable random requests per second. Let $C_{Lu}$ denote the maximum RACH bandwidth that can be used by the network side device for location updating, that is, the number of the allowable concurrently accessed requests per second. Let $C_p$ denote the bandwidth that is used for periodical location updating.

The public access channel is used for the location update access in intercell handover and call access. To perform location updating, the terminal should first access the public access channel. Here, a certain ratio of public access channel resources can be reserved for call access. Here, let $\alpha$ denote the proportion of the public access channel bandwidth reserved for call access in the total RACH access bandwidth. The value of $\alpha$ may be the default value according to the empirical value or dynamically derived by operation parameters and other known network parameters. An algorithm of obtaining the value of $\alpha$ is as follows.

Let $\beta$ denote the call loss expected by the network side device, let $\gamma$ denote the proportion of the number of the user terminals that initiate call access in a unit time in the total registered user terminals, and let $C_{Call}$ denote the bandwidth reserved for the call access. The value of $\alpha$ can be calculated by the following equation:

$$\alpha = \frac{C_{Call}}{C} = \frac{\gamma(N_{Lu} + N_0)(1 - \beta)}{C} \tag{1}$$

The bandwidth reserved for the location updating in intercell handover is the bandwidth used for periodical location updating $C_p$ subtracted from the bandwidth reserved for the call access $C_{Call}$ subtracted from the total access bandwidth C. $N_0/T_p$ is the access bandwidth required for the periodical location updating of the terminals that already reside. Moreover, the terminals that newly enter the location registration area cannot initiate the periodical location updating while initiating the location updating in intercell handover. Therefore, the maximum delay time for the location updating in intercell handover of the terminal can be calculated by the following equation:

$$T_{Lu\_delay\_max} = \frac{N_{Lu}}{C_{Lu}} = \frac{N_{Lu}}{(1 - \alpha)C - N_0/T_p} \tag{2}$$

A $T_{Lu\_delay\_max}$ calculation method as follows can be derived by substituting Equation (1) in Equation (2):

$$T_{Lu\_delay\_max} = \frac{N_{Lu}}{C - \gamma(N_{Lu} + N_0)(1 - \beta) - N_0/T_p} \tag{3}$$

The location updating in intercell handover is instantaneous burst traffic. If a lot of instantaneous mobile users enter the cell in the boundary of the location registration area, the amount of the burst location update access in intercell handover is far more than the number of the call random access requests. Therefore, to reduce the complexity of the system process, let $C_{Lu} \approx C$. The Equation (2) and Equation (3) can be simplified as follows:

$$T_{Lu\_delay\_max} = N_{Lu}/C \qquad (4)$$

Method 3:

The value of $T_{Lu\_delay\_max}$ is determined by loads of different access channels.

The network side device directly determines the value of $T_{Lu\_delay\_max}$ according to the loads of the RACH.

The network side device calculates the statistical average value $E[\xi]$ of current load factors of the network side device in a period of time. During the network plan, n thresholds of the load factors are configured, for example, $\xi_1, \xi_2, \ldots, \xi_n$, where $\xi_1 < \xi_2 \ldots < \xi_n$.

Moreover, $\Delta t$ is set to be a step size. The network side device compares the current load factor $E[\xi]$ with the thresholds $\xi_1, \xi_2, \ldots, \xi_n$. If the current load factor $E[\xi]$ is greater than the $n^{th}$ threshold, let $T_{Lu\_delay\_max} = n*\Delta t$. For example, if the load factor $E[\xi]$ is greater than $\xi_2$ and less than $\xi_3$, let $T_{Lu\_delay\_max} = 2*\Delta t$.

For wireless cellular system that is designed to implement the periodical location updating, assume that the duration of timer for the periodical location updating is $T_p$. In this system, the set value of $T_{Lu\_delay\_max}$ should satisfy the following condition: $T_{Lu\_delay\_max} < T_p$. If $T_{Lu\_delay\_max} \geq T_p$, the set value of $T_{Lu\_delay\_max}$ has no sense, and the terminal initiates the location updating process once the timer for the periodical location updating expires. If the location registration area changes at this time, the new location registration area of the terminal is sent to the network side device in the periodical location updating process.

In s202, the network side device sends location updating congestion control information to the terminal, in which the location updating congestion control information includes the first delay time value.

The network side device sends the location updating congestion control information to the terminal by an active sending method or a passive sending method. The details are as follows.

Method 1:

Network side device-based centralized control in the cell and distributed processing on terminals are adopted. The base station sends location updating congestion control information to the terminals by using a broadcast message. After receiving the location updating congestion control information, the terminals in the cell process the location updating congestion control information according to the uniform instruction and local information to smooth the location updating traffic in intercell handover. In this method, different policies can be used for different network circumstances of different cells to calculate different first delay time values, and then these first delay time values are sent to terminals by using cell broadcast.

Method 2:

Distributed location updating control in intercell handover is adopted on each terminal, that is, the system can provide different location updating policies in intercell handover according to requirements and situations of each terminal, for example, the tolerable call loss. In the embodiments of the present invention, location updating congestion control information is obtained when the terminal implements the network registration process or the initial network location updating process.

In this method, the terminal first sends a delay request to the network. The delay request includes basic information of the terminal, such as an International Mobile Subscriber Identity (IMSI) and a mobile phone number. After receiving the delay request sent by the terminal, the network side device sends a registration response message including the location updating congestion control information to the terminal according to the basic information of the terminal in the delay request.

In s203, the terminal calculates a second delay time value by using a preset algorithm according to the first delay time value in the location updating congestion control information. The first delay time value is set to determine the maximum delay time required in location updating. The second delay time value is calculated in order that numerous terminals can be evenly distributed in the first delay time according to their own situations. Therefore, the terminals neither implement location updating simultaneously at the end of first delay time nor compete in location update access directly when the their own locations change.

Many kinds of methods can be adapted to calculate the second delay time value. For clear explanation, let $T_{Lu\_delay\_ue}$ denote the second delay time value. The detailed calculation methods are as follows.

Method 1:

The terminal generates a random number r in [0,1] and calculates $T_{Lu\_delay\_ue}$ based on the random number r.

$$T_{Lu\_delay\_ue} = r*T_{Lu\_delay\_max}$$

Since r is a random number, $T_{Lu\_delay\_ue}$ calculated by each terminal is evenly distributed on any point between 0 and $T_{Lu\_delay\_max}$.

Method 2:

The Access Class (AC) information is saved in the Subscriber Identity Module (SIM) or Universal Subscriber Identity Module (USIM) of the terminal, and the terminal can calculate $T_{Lu\_delay\_ue}$ by using AC. Different delay time values are assigned according to different ACs to guarantee that the delay time value calculated by the terminal of higher AC priority is less and the delay time value calculated by the terminal of lower AC priority is greater. The delay time values calculated by the terminals of similar AC priorities may be the random values in the same range.

AC is adapted to prevent specific user equipments (UEs) accessing certain areas in the Public Land Mobile-communication Network (PLMN). AC is defined in the Universal Terrestrial Radio Access Network (UTRAN). Each terminal has any one of the ACs 0-9. The AC of the UE is saved in the SIM/USIM card. Besides, these UEs can also have the special ACs 11-15, which is also saved in SIM/USIM. These users of special priorities are defined as follows:

Class 15->Support staff in PLMN
Class 14->Emergency services
Class 13->Public affairs
Class 12->Safety services
Class 11->PLMN network applications The values of $T_{Lu\_delay\_ue}$ are different due to the different priorities.

The second delay time value is calculated by the following equation:

$$T_{Lu\_delay\_ue} = \phi(q,v)*T_{Lu\_delay\_max}*r$$

where $\phi(q,v)$ is the function of the terminal priority q and terminal movement velocity v, and r is a random number in [0,1].

In s204, the terminal detects whether its own location registration area changes.

If the terminal moves from a current service cell to another cell, the terminal can detect its intercell handover from the original service cell to a new cell. If the location of the terminal does not change, the terminal continues to perform the detection. If the location registration area of the terminal changes, the procedure proceeds to the next step.

In s205, if a detection result is that the location registration area changes, the terminal counts the time and sends a location updating request to the network side device after the counted time reaches the second delay time value.

In the case that the location registration area of the terminal changes, the terminal should send the location updating request to the network side device. To avoid excessive location updating requests and control the possible congestion, the terminal delays sending the request according to the second delay time value to avoid the request sending peak and sends the location updating request to the network side device after the second delay time.

After the terminal counts the time, if a call to be initiated is detected during the time counting, $T_{Lu\_delay\_ue}$ is set to 0 immediately, the time counting is stopped, and then the location updating is initiated at once. After the location updating succeeds, the call access is initiated to satisfy the terminal call of the access user.

According to the embodiments of the present invention, the first delay time value is the maximum delay time value of the terminal, while the second delay time value is the specific delay time of each terminal. Therefore, the first delay time value is greater than or equal to the second delay time value.

The location registration area according to the embodiments of the present invention is a location area, routing area, tracking area, or registration area.

The technical solutions according to the embodiments of the present invention provide a method for dynamically adjusting a location updating policy in intercell handover. By this method, the first delay time value and the second delay time value are set, so it can be effectively controlled whether the terminal initiates the location updating immediately or initiates the location updating with delay in intercell handover, so as to effectively smooth the system bandwidth required in the location updating, reduce the system call loss, and increase the terminal location updating efficiency and wireless resource utilization ratio.

Embodiment 3 of the present invention provides a method for congestion control in location updating. Embodiment 3 is different from Embodiment 2. In Embodiment 2, the terminal generates the second delay time value according to the first delay time value in the location updating congestion control information sent by the network side device, and then counts the time and delays for a period of time, and then sends the location updating request. In Embodiment 3, the network side device only sends the location updating congestion control information to the terminal, and the terminal generates the second delay time value according to the congestion degree information in the location updating congestion control information and a step size time parameter of the delay.

Figure 3:
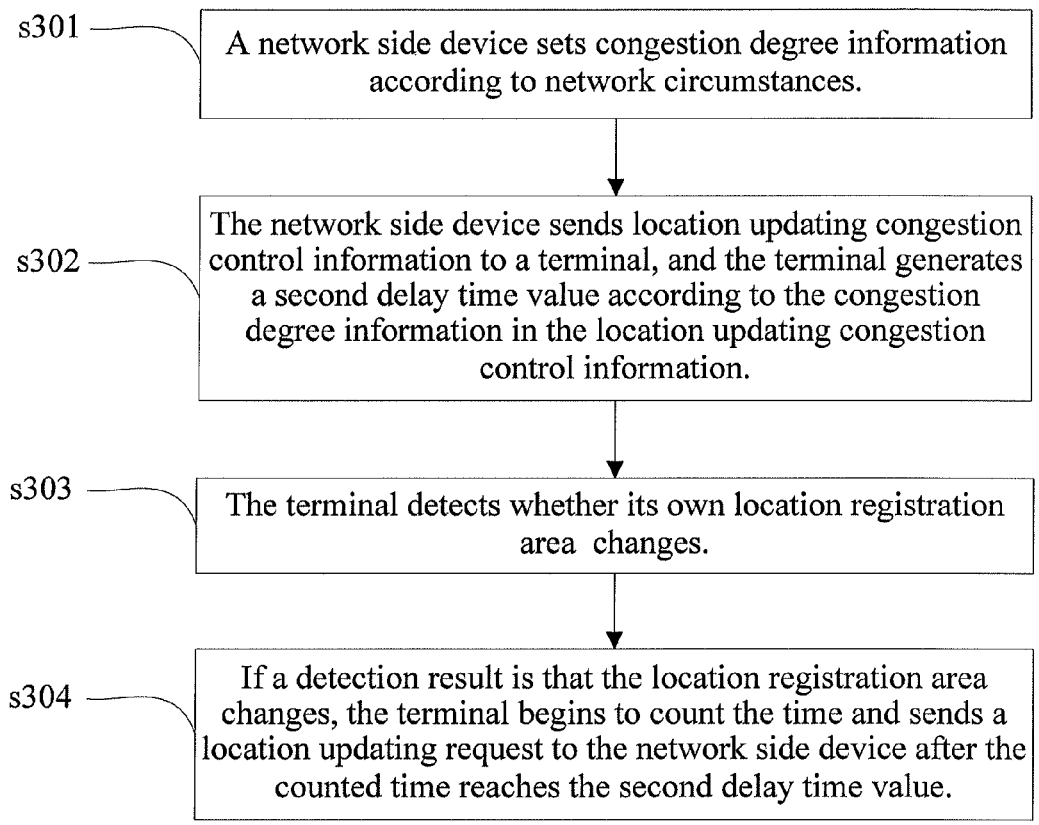
FIG. 3 is a flow chart of a method for congestion control in location updating according to Embodiment 3 of the present invention.

As shown in FIG. 3, the method includes the following steps:

In s301, a network side device sets congestion degree information according to network circumstances.

The network side device controls network congestion based on the network congestion degree. In this embodiment, the network side device comprehensively examines utilization situations of resources required by all involved location updating in a period of time. If finding network congestion, the network side device sends location updating congestion control information to a terminal, in which the location updating congestion control information includes the congestion degree information, which is adapted to express the current network congestion degree. Let $\eta_i$ denote a congestion degree class, where $\eta_i \in \{\eta_1, \eta_2 \ldots \eta_N\}$ and $\eta_1 < \eta_2 \ldots \eta_N$. The terminal generates a different second delay time value according to a different congestion degree class. For example, the network congestion degree is classified into 10 classes between full congestion and non-congestion. If the congestion degree class corresponding to the first class is $\eta_1$, the congestion degree $\eta_1$ is 10%.

In s302, the network side device sends location updating congestion control information to the terminal, and the terminal generates a second delay time value according to the congestion degree information in the location updating congestion control information.

The terminal presets the step size time parameter of the delay $\Delta t$, which is based on average time required for the terminal accessing the network. The time for different terminals accessing the network is different. Therefore, the step size time parameter of the delay may be an average time value.

The second delay time value is calculated by the following equation:

$$T_{Lu\_delay\_ue} = \phi(q,v) * (i\Delta t) * r$$

where $\phi(q,v)$ is the function of the terminal priority q and terminal movement velocity v, i corresponds to the congestion degree, and r is a random number in [0,1].

For the system where the periodical location updating time $T_p$, $T_{Lu\_delay\_max}$ calculated by the terminal should meet the following condition: $T_{Lu\_delay\_max} \leq T_p$.

In s303, the terminal detects whether its own location registration area changes.

If the terminal moves from a current service cell to another cell, the terminal can detect its intercell handover from the original service cell to a new cell. If the terminal location does not change, the terminal continues to perform the detection. If the location registration area of the terminal changes, the procedure proceeds to s304.

In s304, if a detection result is that the location registration area changes, the terminal counts the time and sends a location updating request to the network side device after the counted time reaches the second delay time value.

In the case that the location registration area of the terminal changes, the terminal should send the location updating request to the network side device. To avoid excessive location updating requests received by the network side device, the possible resulting congestion needs to be controlled. The terminal delays sending the request according to the second delay time value to avoid the location updating request sending peak and sends the location updating request to the network side device after the second delay time.

After the terminal counts the time, if a call to be initiated is detected during the time counting, $T_{Lu\_delay\_ue} = 0$ is set to 0 immediately, the time counting is stopped, and then the location updating is initiated at once. After the location updating succeeds, the call access is initiated to satisfy the terminal call of the access user. Call access can be initiated by the terminal only after the terminal location updating. Therefore, if a terminal in a different area wants to initiate call access, the location updating should be first implemented.

The location registration area according to the embodiments of the present invention is a location area, routing area, tracking area, or registration area.

The technical solutions according to the embodiments of the present invention provide a method for dynamically adjusting a location updating policy in intercell handover. By this method, location updating congestion control information is set, the congestion degree is set according to network circumstances, and the second delay time value is calculated according to the congestion degree, so it can be effectively controlled whether the terminal initiates the location updating immediately or initiates the location updating with delay in intercell handover, so as to effectively smooth the system bandwidth required in the location updating, reduce the system call loss, and increase the terminal location updating efficiency and wireless resource utilization ratio.

Figure 4:
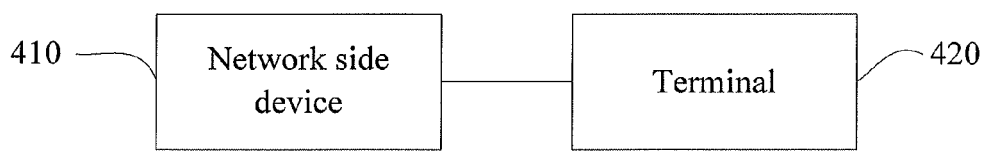
FIG. 4 is a structural schematic view of a system for congestion control in location updating according to Embodiment 4 of the present invention.

As shown in FIG. 4, Embodiment 4 of the present invention provides a system, for congestion control in location updating, which includes a network side device 410 and a terminal 420.

The network side device 410 is adapted to set location updating congestion control information according to network circumstances and sends the location updating congestion control information to the terminal 420.

The terminal 420 is adapted to receive the location updating congestion control information set by the network side device 410 according to the network circumstances, generate a second delay time value according to the location updating congestion control information, and detect whether the location registration area of the terminal 420 changes. If a detection result is that the location registration area changes, the terminal 420 counts the time and sends a location updating request to the network side device 410 after the counted time reaches the second delay time.

Figure 5:
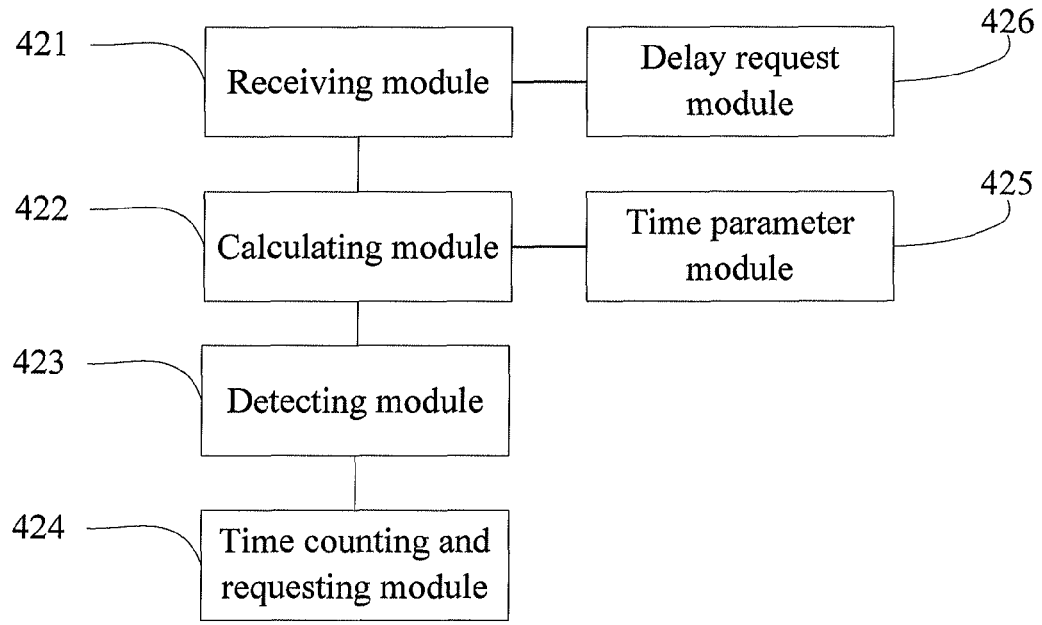
FIG. 5 is a structural schematic view of a terminal for congestion control in location updating according to Embodiment 4 of the present invention.

The terminal 420 is adapted to implement the congestion control in location updating. As shown in FIG. 5, the terminal 420 includes a receiving module 421, a calculating module 422, a detecting module 423, and a time counting and requesting module 424.

The receiving module 421 is adapted to receive the location updating congestion control information sent by the network side device 410. The location updating congestion control information is set by the network side device 410 according to the network circumstances.

The network side device 410 sends the location updating congestion control information to the terminal 420. In the present invention, the sending method includes an active sending method and a passive sending method. The details are as follows.

Method 1:

Network side device-based centralized control in the cell and distributed processing on terminals are adopted. The network side device 410 sends location updating congestion control information to the terminal 420 through a base station by using a broadcast message. After receiving the location updating congestion control information, the terminal 420 in the cell processes the location updating congestion control information according to the uniform instruction and local information to smooth the location updating traffic in intercell handover. This method can be based different cells and different network circumstances. Then the location updating congestion control information is sent to terminals by using cell broadcast.

Method 2:

Distributed location updating control in intercell handover is adopted on each terminal, that is, the system can provide different location updating policies in intercell handover according to requirements and situations of each terminal, for example, the tolerable call loss. In the present invention, location updating congestion control information is obtained when the terminal 420 implements the network registration process or the initial network location updating process.

By this method, the receiving module 421 of the terminal 420 first sends a delay request to the network side device 410. After receiving the delay request sent by the terminal 420, the network side device 410 sends a response message including location updating congestion control information to the terminal 420 according to the terminal identifier information in the delay request.

The calculating module 422 is adapted to calculate the second delay time value by using a preset algorithm according to the location updating congestion control information received by the receiving module 421.

Here, the calculating method includes two methods. In Method 1, a first delay time value is extracted from the location updating congestion control information sent by the network side device 410, and the second delay time value is calculated according to the first delay time value. In Method 2, the second delay time value is calculated according to congestion degree information extracted from the location updating congestion control information. To set the first delay time value and congestion degree information, refer to the description of network side device 410.

Method 1:

The second delay time value can be calculated by many modes.

The terminal 420 can also generate a random number in [0,1] and calculate the second delay time value based on the random number. Since r is a random number, $T_{Lu\_delay\_ue}$ calculated by each terminal is evenly distributed on any point between 0 and $T_{Lu\_delay\_max}$.

The AC information is saved in the SIM/USIM card of the terminal 420, and the terminal 420 can calculate $T_{Lu\_delay\_ue}$ by using AC. Different delay time values are assigned according to different ACs to guarantee that the delay time value calculated by the terminal of higher AC priority is less and the delay time value calculated by the terminal of lower AC priority is greater. The delay time values calculated by the terminals of similar AC priorities may be the random values in the same range.

The second delay time value is calculated by the following equation:

$$T_{Lu\_delay\_ue} = \phi(q,v) * T_{Lu\_delay\_max} * r$$

where $\phi(q,v)$ is the function of the terminal priority q and terminal movement velocity v, and r is a random number in [0,1].

The first delay time value is set to determine the maximum delay time required in location updating implemented by the terminal 420. The second delay time value is calculated in order that numerous terminals 420 can be evenly distributed in the first delay time according to their own situations. Therefore, the terminals neither implement location updating simultaneously at the end of first delay time nor compete in location update access directly when the their own locations change.

Method 2:

The terminal extracts the congestion degree information from the received location updating congestion control information. The calculating module 422 calculates the second delay time value by using the preset time step size parameter algorithm according to the congestion degree information.

Let $\eta_i$ denote a congestion degree class, where $\eta_i \in \{\eta_1, \eta_2 \ldots \eta_N\}$ and $\eta_1 < \eta_2 \ldots < \eta_N$. The terminal generates a different second delay time value according to a different congestion degree class. The terminal presets the step size time parameter of the delay $\Delta t$, which is based on average time required for the terminal accessing the network.

The second delay time value is calculated by the following equation:

$$T_{Lu\_delay\_ue} = \phi(q,v)*(i\Delta t)*r$$

where $\phi(q,v)$ is the function of the terminal priority q and terminal movement velocity v, i corresponds to the congestion degree, and r is a random number in [0,1].

The detecting module 423 is adapted to detect whether the location registration area changes.

If the terminal 420 moves from a current service cell to another cell, the terminal 420 can detect its intercell handover from the original service cell to a new cell. If the location registration area of the terminal 420 does not change, the terminal 420 continues to perform the detection. If the location registration area of the terminal 420 changes, the procedure proceeds to the next step.

The time counting and requesting module 424 is adapted to count time and send a location updating request to the network side device 410 after the counted time reaches the second delay time value calculated by the calculating module 422 if a detection result is that the location registration area changes.

The terminal 420 further includes a time parameter module 425.

The time parameter module 425 is adapted to save the step size time parameter preset based on average time for accessing the network. The calculating module 422 obtains the second delay time value by using a preset time parameter algorithm according to the congestion degree information in the location updating congestion control information and the step size time parameter in the time parameter module 425.

The terminal 420 further includes a delay request module 426.

The delay request module 426 is adapted to send a delay request to the network side device.

The receiving module 421 receives the location updating congestion control information sent by the network side device 410 according to the delay request.

The detecting module 423 is also adapted to detect whether a call is to be initiated by the terminal 420 after time counting.

If a call to be initiated is detected during the time counting, the time counting and requesting module 424 stops the time counting and sends the location updating request to the network side device 410 immediately.

If a call to be initiated is not detected during the time counting, the time counting and requesting module 424 sends the location updating request to the network side device 410 after the counted time reaches the second delay time value.

In the case that the location registration area of the terminal 420 changes, the terminal 420 should send the location updating request to the network side device 410. To avoid excessive location updating requests and control the possible congestion, the terminal 420 delays sending the request according to the second delay time value to avoid the request sending peak and sends the location updating request to the network side device 410 after the counted time reaches the second delay time value.

According to the embodiments of the present invention, the first delay time value is the maximum delay time value of the terminal, while the second delay time value is the specific delay time of each terminal. Therefore, the first delay time value is greater than or equal to the second delay time value.

The location registration area where the terminal is located may be a location area, routing area, tracking area, or registration area.

Figure 6:
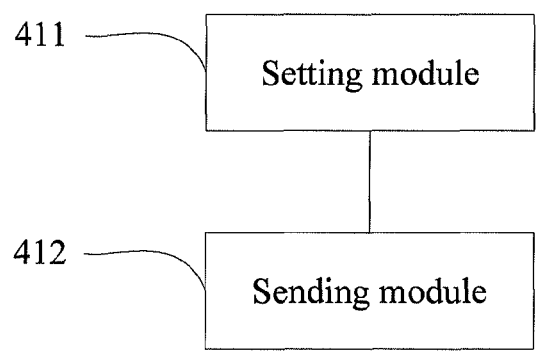
FIG. 6 is a structural schematic view of a network side device for congestion control in location updating according to Embodiment 4 of the present invention.

The network side device 410 is adapted to implement the congestion control in location updating. As shown in FIG. 6, the network side device 410 includes a setting module 411 and a sending module 412.

The setting module 411 is adapted to set location updating congestion control information according to network circumstances.

Since the terminal can calculate the second delay time value by different methods, the location updating congestion control information can be set by the following two methods.

In Method 1 for setting the location updating congestion control information, the network side device sets the first delay time value according to network circumstances.

The first delay time value can be set by the following methods.

In Method 1 for setting the first delay time value, the network circumstances of the network side device 410 are assessed to generate an empirical value of the first delay time value, and the first delay time value is set according to the empirical value. The empirical value is adapted to give the default value of the first delay time value. The empirical value is obtained by experimenting and testing for a long time, gathering statistics of the experiment and test and calculating the results.

In Method 2 for setting the first delay time value, the first delay time value is generated according to the number of the terminals 420 requiring the location updating and a location request access bandwidth parameter of the network side device.

In Method 3 for setting the first delay time value, the value of $T_{Lu\_delay\_max}$ is determined by loads of different access channels.

In Method 2 for setting the location updating congestion control information, the network side device sets the congestion degree according to network congestion degree situations.

In this embodiment, the network side device comprehensively examines utilization situations of resources required by all involved location updating in a period of time. If finding network congestion, the network side device sends location updating congestion control information to the terminal, in which the location updating congestion control information includes the congestion degree information, which is adapted to express the current network congestion degree. Let $\eta_i$ denote a congestion degree class, where $\eta_i \in \{\eta_1, \eta_2 \ldots \eta_N\}$ and $\eta_1 < \eta_2 \ldots < \eta_N$. The terminal generates a different second delay time value according to a different congestion degree class. For example, the network congestion degree is classified into 10 classes between full congestion and non-congestion. If the congestion degree class corresponding to the first class is $\eta_1$, the congestion degree $\eta_1$ is 10%.

The sending module 412 is adapted to send the location updating congestion control information set by the setting module 411 to the terminal 420.

The network side device 410 sends the location updating congestion control information to the terminal 420. In the present invention, the sending method includes an active sending method and a passive sending method. The details are as follows.

In Method 1, network side device-based centralized control in the cell and distributed processing on terminals are adopted. The network side device 410 sends location updating congestion control information to the terminal 420 through a base station by using a broadcast message. After receiving the location updating congestion control information, the terminal 420 in the cell process the location updating congestion control information according to the uniform instruction and local information to smooth the location updating traffic in intercell handover. In this method, different policies can be adapted to calculate different location updating congestion control information according to different network circumstances of different cells, and then the location updating congestion control information are sent to terminals by using cell broadcast.

In Method 2, distributed location updating control in intercell handover is adopted on each terminal, that is, the system can provide different location updating policies in intercell handover according to requirements and situations of each terminal, for example, the tolerable call loss. In the present invention, location updating congestion control information is obtained when the terminal 420 implements the network registration process or the initial network location updating process.

By this method, the receiving module 421 of the terminal 420 first sends a delay request to the network side device 410. After receiving the delay request sent by the terminal 420, the network side device 410 sends a response message including location updating congestion control information to the terminal 420 according to the terminal identifier information in the delay request.

For wireless cellular system that is designed to implement the periodical location updating, assume that the duration of timer for the periodical location updating is $T_p$. In this system, the set value of $T_{Lu\_delay\_max}$ should satisfy the following condition: $T_{Lu\_delay\_max} < T_p$. If $T_{Lu\_delay\_max} \geq T_p$, the set value of $T_{Lu\_delay\_max}$ has no sense, and the terminal initiates the location updating process once the timer for the periodical location updating expires. If the location registration area changes at this time, the new location registration area of the terminal is sent to the network side device in the periodical location updating process.

The location registration area according to the embodiments of the present invention is a location area, routing area, tracking area, or registration area.

The technical solutions according to the embodiments of the present invention provide a method for dynamically adjusting a location updating policy in intercell handover. By this method, location updating congestion control information is set, and the delay time is generated according to the information, so it can be effectively controlled whether the terminal initiates the location updating immediately or initiates the location updating with delay in intercell handover, so as to effectively smooth the system bandwidth required in the location updating, reduce the system call loss, and increase the terminal location updating efficiency.

Through the descriptions of the embodiments, those skilled in the art may understand that the present invention may be implemented by using hardware only or by using software and a necessary universal hardware platform. Based on such understandings, the technical solution of the present invention may be embodied in the form of a software product. The software product may be stored in a nonvolatile storage medium, which can be a Compact Disk Read-Only Memory (CD-ROM), Universal Serial Bus (USB) flash drive, or a removable hard drive. The software product includes a number of instructions that enable a computer apparatus (personal computer, server, or network apparatus) to execute the methods provided in the embodiments of the present invention.

It should be understood by persons skilled in the art that the accompanying drawings are merely schematic views of a preferred embodiment, and modules or processes in the accompanying drawings are not necessarily required in implementing the present invention.

The above descriptions are merely preferred embodiments of the present invention. It should be noted by persons of ordinary skill in the art that modifications and improvements may be made without departing from the principle of the present invention, which should be construed as falling within the scope of the present invention.

What is claimed is:

1. A method for congestion control in location updating, comprising:
    setting, by a network side device, location updating congestion control information according to network circumstances, wherein the location updating congestion control information is used by a terminal to obtain a second delay time value by using a preset time parameter algorithm according to the location updating congestion control information; and
    sending, by the network side device, the location updating congestion control information to the terminal so as to detect, by the terminal, whether a location registration area of the terminal changes; and if a detection result is that the location registration area changes, count time by the terminal and send, by the terminal, a location updating request to the network side device after counted time reaches the second delay time value;
    wherein the location updating congestion control information comprises congestion degree information; and
    wherein the process of obtaining a second delay time value by using a preset time parameter algorithm according to the location updating congestion control information comprises:
    obtaining the second delay time value by using the preset time parameter algorithm according to the congestion degree information in the location updating congestion control information and a preset step size time parameter.

2. The method according to claim 1, wherein the step size time parameter is set based on average time for the terminal accessing a network.

3. A method for congestion control in location updating, comprising:
    setting, by a network side device, location updating congestion control information according to network circumstances, wherein the location updating congestion control information is used by a terminal to obtain a second delay time value by using a preset time parameter algorithm according to the location updating congestion control information; and
    sending, by the network side device, the location updating congestion control information to the terminal so as to detect, by the terminal, whether a location registration area of the terminal changes; and if a detection result is that the location registration area changes, count time by the terminal and send, by the terminal, a location updating request to the network side device after counted time reaches the second delay time value;
    wherein the location updating congestion control information comprises a first delay time value; and
    wherein the process of obtaining a second delay time value by using a preset time parameter algorithm according to the location updating congestion control information comprises:
    obtaining, by the terminal, the second delay time value by using the preset algorithm according to the first delay time value in the location updating congestion control information, wherein the first delay time value is set according to the network circumstances.

4. The method according to claim 3, wherein the first delay time value is set according to the network circumstances comprises:
the first delay time value is generated by the network side device according to the number of the terminals requiring the location updating and a location request access bandwidth parameter of the network side device.

5. The method according to claim 3, wherein the obtaining the second delay time value by using the preset algorithm according to the first delay time value comprises:
calculating the second delay time value according to an inherent priority of the terminal and the first delay time value.

6. The method according to claim 3, wherein the obtaining the second delay time value by using the preset algorithm according to the first delay time value comprises:
calculating the second delay time value according to a random number generated by the terminal and the first delay time value.

7. The method according to claim 1, wherein the process of counting time by the terminal and sending the location updating request to the network side device after counted time reaches the second delay time value comprises:
counting the time by the terminal and detecting, by the terminal, whether a call is to be initiated by the terminal;
if a call to be initiated is detected during the time counting, stopping, by the terminal, the time counting and sending a location updating request to the network side device; otherwise
if a call to be initiated is not detected during the time counting, sending, by the terminal, the location updating request to the network side device after the counted time reaches the second delay time value.

8. The method according to claim 3, wherein the first delay time value is greater than or equal to the second delay time value.

9. The method according to claim 1, wherein the location registration area is a location area, routing area, tracking area, or registration area.

10. A terminal, for congestion control in location updating, comprising:
a receiving module, adapted to receive location updating congestion control information sent by a network side device, wherein the location updating congestion control information is set according to network circumstances;
a calculating module, adapted to obtain a second delay time value by using a preset algorithm according to the location updating congestion control information received by the receiving module;
a detecting module, adapted to detect whether a location registration area of the terminal changes;
a time counting and requesting module, adapted to count time and send a location updating request to the network side device after the counted time reaches the second delay time value calculated by the calculating module if a detection result is that the location registration area changes; and
a time parameter module, adapted to save a step size time parameter preset according to average time for accessing a network;
wherein the location updating congestion control information comprises congestion degree information;
wherein in a process of obtaining the second delay time value, the calculating module is adapted to obtain the second delay time value by using the preset time parameter algorithm according to the congestion degree information in the location updating congestion control information and the step size time parameter in the time parameter module.

11. A terminal, for congestion control in location updating, comprising:
a receiving module, adapted to receive location updating congestion control information sent by a network side device, wherein the location updating congestion control information is set according to network circumstances;
a calculating module, adapted to obtain a second delay time value by using a preset algorithm according to the location updating congestion control information received by the receiving module;
a detecting module, adapted to detect whether a location registration area of the terminal changes; and
a time counting and requesting module, adapted to count time and send a location updating request to the network side device after counted time reaches the second delay time value calculated by the calculating module if a detection result is that the location registration area changes;
wherein the location updating congestion control information comprises a first delay time value;
wherein in the process of obtaining the second delay time value, the calculating module is adapted to obtain the second delay time value by using the preset algorithm according to the first delay time value in the location updating congestion control information, wherein the first delay time value is set according to the network circumstances.

12. The terminal according to claim 11 wherein in the process of obtaining the second delay time value by using the preset algorithm according to the first delay time value in the location updating congestion control information, the calculating module is adapted to generate a random number and calculates the second delay time value according to the random number and the first delay time value.

13. The terminal according to claim 10, further comprising:
a delay request module, adapted to send a delay request to the network side device wherein the receiving module is adapted to receive the location updating congestion control information sent by the network side device according to the delay request.

14. The terminal according to claim 10, wherein the receiving module is adapted to receive the location updating congestion control information sent by the network side device by using cell broadcast.

15. The terminal according to claim 10, wherein the detecting module is further adapted to detect whether a call is to be initiated by the terminal after the time counting is begun; and
if a call to be initiated is detected during the time counting, the time counting and requesting module stops the time counting and sends the location updating request to the network side device immediately; otherwise
if a call to be initiated is not detected during the time counting, the time counting and requesting module sends the location updating request to the network side device after the counted time reaches the second delay time value.

16. A network side device, for congestion control in location updating, comprising:
a setting module, adapted to set location updating congestion control information according to network circumstances, wherein the location updating congestion control information is used by a terminal to obtain a second delay time value by using a preset time parameter algorithm according to the location updating congestion control information; and a sending module, adapted to send the location updating congestion control information set by the setting module to the terminal so as to detect, by the terminal, whether a location registration area of the terminal changes; and if a detection result is that the location registration area changes, count time by the terminal and send, by the terminal, a location updating request to the network side device after counted time reaches the second delay time value;

wherein the location updating congestion control information comprises a first delay time value set according to the network circumstances; and the setting modules assesses the network circumstances of the network side device to generate an empirical value of the first delay time value and set the first delay time value according to the empirical value.

17. A network side device, for congestion control in location updating, comprising:

a setting module, adapted to set location updating congestion control information according to network circumstances, wherein the location updating congestion control information is used by a terminal to obtain a second delay time value by using a preset time parameter algorithm according to the location updating congestion control information; and a sending module, adapted to send the location updating congestion control information set by the setting module to the terminal so as to detect, by the terminal, whether a location registration area of the terminal changes; and if a detection result is that the location registration area changes, count time by the terminal and send, by the terminal, a location updating request to the network side device after counted time reaches the second delay time value;

wherein the location updating congestion control information comprises a first delay time value; and the setting module generates the first delay time value according to the number of the terminals requiring the location updating and a location request access bandwidth parameter of the network side device.

18. A network side device, for congestion control in location updating, comprising:

a setting module, adapted to set location updating congestion control information according to network circumstances, wherein the location updating congestion control information is used by a terminal to obtain a second delay time value by using a preset time parameter algorithm according to the location updating congestion control information; and a sending module, adapted to send the location updating congestion control information set by the setting module to the terminal so as to detect, by the terminal, whether a location registration area of the terminal changes; and if a detection result is that the location registration area changes, count time by the terminal and send, by the terminal, a location updating request to the network side device after counted time reaches the second delay time value;

wherein the location updating congestion control information comprises congestion degree information; and the setting module sets the congestion degree information according to network congestion degree situations.

19. The terminal according to claim 11 wherein in the process of obtaining the second delay time value by using the preset algorithm according to the first delay time value in the location updating congestion control information, the calculating module is adapted to calculate the second delay time value according to an inherent priority of the terminal and the first delay time value in the location updating congestion control information.

* * * * *